United States Patent [19]

Oliver et al.

[11] Patent Number: 4,576,649
[45] Date of Patent: Mar. 18, 1986

[54] COLOR ENHANCED PERMANENT PIGMENTS FROM PRECIPITATED CATIONIC DYES

[75] Inventors: Vincent S. Oliver, West Orange; Walter Tames, Hillside; Helmuth H. Prochaska; Karl-Heinz Wieser, both of Wayne, all of N.J.

[73] Assignee: Mobay Chemical Corporation, Pittsburgh, Pa.

[21] Appl. No.: 666,947

[22] Filed: Oct. 31, 1984

[51] Int. Cl.$^4$ ................................................ C09C 3/00
[52] U.S. Cl. ................................ 106/308 Q; 106/27; 106/308 F; 106/309
[58] Field of Search ........... 106/22, 27, 308 F, 308 Q, 106/309

[56] References Cited

U.S. PATENT DOCUMENTS

| | | | |
|---|---|---|---|
| 2,192,954 | 3/1940 | Sloan et al. | 134/58 |
| 2,192,956 | 3/1940 | Sloan et al. | 134/58 |
| 3,120,508 | 2/1964 | Braun et al. | 260/161 |
| 3,573,946 | 4/1971 | Wolf et al. | 106/308 |
| 3,671,281 | 6/1972 | Doss | 106/308 Q |
| 4,042,545 | 8/1977 | Dèfago et al. | 106/22 |
| 4,432,900 | 2/1984 | Pociluyko | 106/22 |

FOREIGN PATENT DOCUMENTS

| | | |
|---|---|---|
| 1080115 | 8/1967 | United Kingdom . |
| 1156836 | 7/1969 | United Kingdom . |

OTHER PUBLICATIONS

The Chemistry of Synthetic Dyes and Pigments, Section 11, Organic Pigments, E. R. Allen, 1972, pp. 625–661.
Pigments Handbook, vol. 1, pp. 605–616.
Pigments Handbook, vol. 3, pp. 159–167.
Pigment and Dyestuff Manual of Bayer A.G., pp. 194–195.

*Primary Examiner*—Paul Lieberman
*Assistant Examiner*—Willie J. Thompson
*Attorney, Agent, or Firm*—Gene Harsh; Lawrence S. Pope

[57] ABSTRACT

The present disclosure is concerned with the preparation of permanent pigments from selected cationic dyes by precipitation from aqueous solution with complex heteropoly acids in the presence of selected amine color enhancing agents. Typical of the dyes is Color Index Basic Red 12, typical of the complex heteropoly acid is silicomolybdic acid and typical of the amine color enhancing agents are abietyl amine, cetyl pyridinium chloride and benzyl tri-n-alkyl ammonium chlorides. The pigments are disclosed to have superior cleanliness, brightness and transparency compared to the same pigments prepared without the amine color enhancing agent. These pigments are disclosed to have particular utility in printing inks such as components of process red for four color printing.

24 Claims, No Drawings

COLOR ENHANCED PERMANENT PIGMENTS FROM PRECIPITATED CATIONIC DYES

FIELD OF THE INVENTION

The present invention is concerned with permanent pigments obtained by insolubilizing selected basic or cationic dyes with complex heteropoly acids in the presence of selected color enhancing agents which gives these pigments sufficient color values to be of interest in formulating high quality lithographic inks.

BACKGROUND OF THE INVENTION

It is very well known that useful pigments can be obtained by insolubilizing water soluble dyes. This is usually accomplished by reacting a molecularly bulky counter-ion with an acid or basic dye. For instance Lithol Rubine B, which is the azo dye of a 6-amino-m-toluene sulfonic acid and 2-hydroxy-3-naphthoic acid, is precipitated with calcium to yield Color Index Pigment Red 57. Similarly Color Index Basic Violet 10 is precipitated with phosphomolybdic or phosphotungstic acid to yield Color Index Pigment Violet 1. These dyestuffs may be permanently or non-permanently insolubilized depending on the nature of the precipitating agent. In the case of the basic or cationic dyes the complex heteropoly acids give permanent pigments while agents such as tannic acid and tartar emetic (antimony-potassium tartrate) give nonpermanent or fugitive pigments. Both of these types of pigments are used in printing inks. These organic pigments and their utility in printing inks are discussed at pages 625 to 661 of *The Chemistry of Synthetic Dyes and Pigments*, edited by H. A. Lubs, A.C.S. and Robert E. Krieger Publishing company, 1972. The permanent pigments from basic dyes and their uses are also discussed at pages 605 to 616 of Volume 1 of the *Pigments Handbook*.

It is also known to treat the surface of pigments in general to improve their dispersibility and this is extensively discussed at pages 159 to 167 of Volume 3 of the *Pigments Handbook*. Among these techniques is the coprecipitation of rosin with azo dyes such as Lithol Rubine B which results in a pigment with high color strengths and good transparency. A variant of this technique involves using rosin (abietic acid) derivatives with low solubility ammonium counter ions obtained from long chain aliphatic amines. Another technique involves the coating of suspended pigment particles with amines. U.S. Pat. Nos. 2,192,954 and 2,192,956 teach treating inorganic pigments with a variety of amines including quaternary ammonium salts and N-alkyl pyridinium salts such as hexadecyl trimethyl ammonium bromide and hexadecyl pyridinium bromide. Example VI of the former patent also teaches the treatment of an organic pigment, Lake Bordeaux B which is formed by the metallic salt precipitation of an anionic dye, with hexadecyl pyridinium bromide to make a printing ink.

The art also teaches the coprecipitation of a cationic surface agent and an azo pigment. These pigments precipitate upon azo coupling rather than upon complexing of cationic or anionic groups on the chromophore bearing molecule. Since these colorant compounds are water insoluble they precipitate upon formation. U.S. Pat. Nos. 3,120,508 and 3,573,946 disclose adding various ammonium salts including oleylamine-acetate, tallow fat amineacetate and coconut fat acetate to the azo coupling bath. This treatment results in an increase in the tinctorial strength. The U.S. Pat. No. 3,573,946 discloses the treatment of laked dyes as well as azo pigments. However, pigments other than those formed immediately upon azo coupling are treated well after formation of the pigment. These post treated pigments, such as copper phthalocyanines, yield printing inks with good tinctorial strength as do the inks based on the azo pigments.

There is also some suggestion in United Kingdom Patent No. 1,156,836 to treat aqueous color suspensions simultaneously with metal compounds or resins and rosin amine (dehydroabietyl amine). The precise import of this suggestion is unclear but evidently this is not intended to convey the concept of coprecipitation of a laked pigment and an amine. In the only example of a laked dye, Example 3 at page 4, the dye is first insolubilized with a barium ion and then treated with rosin amine. A similar post laking treatment is disclosed in Examples 3 and 4 at pages 4 and 5 of United Kingdom Patent No. 1,080,115 and is generically described at page 3, lines 19 to 24. However, the treating agent in this patent is a long chain aliphatic amine.

There has been interest in developing new pigments by insolubilizing dyes of good color strength. However, the inability to obtain a clean bright color on precipitation has inhibited the development of such pigments. For instance, although the pigment obtained by precipitating Color Index Basic Red 12 with silico-molybdic acid was commercially used in the United States in a very minor amount as a shading component, its color was too poor to be used as a substantial pigment component. In fact, although the Pigment and Dyestuff Manual of Bayer A.G., a producer of Color Index Basic Red 12, suggested at page 195 that a precipitate of this dye (called Astra Phloxine G) would find utility in a flexographic printing ink, it has not been so used.

This dye would be of particular interest to the printing industry if it could be converted into a clean bright pigment of good transparency. It has a shade which would make such a pigment a viable alternative to Color Index Pigment Red 81 in blends with Color Index Pigment Red 57 to yield a process red ink for the four color paper printing process. The better the quality of the process red desired, the more of the Pigment Red 81 which is used in the blend. However, the shade of the Pigment Red 81 is not ideal and it is between three and four times more expensive than the Red 57.

It has now been discovered how to obtain a pigment from Color Index Basic Red 12 which is equally clean and bluer than Color Index Pigment Red 81. It has also been discovered how to substantially improve the color value of other selected complex heteropoly acid precipitated cationic dyes.

SUMMARY OF THE INVENTION

The present invention is concerned with a process for obtaining high quality permanent pigments from selected cationic dyes by precipitating these dyes from aqueous solutions with complex heteropoly acids in the presence of selected amine color enhancing agents, the pigments obtained from this procedure and the utilization of these pigments in printing inks. The cationic dyes are selected from the group consisting of Color Index Basic Red 12, Color Index Basic Red 14, Color Index Basic Red 28 and Color Index Basic Violet 10. The color enhancing agent is a quaternary ammonium salt, an ammonium salt of an amine derived from rosin, or the complex of either of these with a complex heteropoly acid.

DETAILED DESCRIPTION OF THE INVENTION

The cationic dye may be any of Color Index Basic Red 12, Color Index Basic Red 14, Color Index Basic Violet 10 or Color Index Basic Red 28. The anion associated with the dye may be any of those known in dyestuff chemistry which is displaceable by a complex heteropoly acid under strongly acidic conditions. The most common anions utilized with these dyes are the sulfate, dihydrogen phosphate and chloride ions with the chloride ion being the most preferred. The Color Index Basic Red 12, Color Index Basic Red 14 and the Color Index Basic Red 28 are preferred with the Basic Red 12 being especially preferred.

The dyes may initially be in either solid or liquid form. These dyes are typically available in powdered form, usually physically mixed with standardizing agents and packaging agents. They may also be utilized in the form of press cake obtained from their chemical synthesis. A particularly convenient form is in solution. In this regard the Basic Red 12 is available dissolved in acetic acid which is a particularly preferred form.

The complex heteropoly acid may be any of those recognized in the art as suitable for insolubilizing cationic dyes to form permanent basic dye derived pigments. These are typically complex acids formed from the oxides of molybdenum, tungsten or both and phosphorus, silicon or both. In some of the suitable complex acids a portion of the phosphorus or silicon is replaced by vanadium. Typically this is done to enhance the high temperature tolerance of the pigment for applications such as coloring nitro-cellulose. The preferred complex heteropoly acids are phosphotungstic acid, phosphomolybdic acid, silicomolybdic acid, silicotungstic acid, phosphosilicotungstic acid, phosphosilicomolybdic acid, phosphomolybdic tungstic acid, silicomolybdic tungstic acid, and phosphosilico molybdic tungstic acid. Other suitable acids include phosphovanadomolybdic acid, phosphovanado tungstic acid, silicovanadomolybdic acid, silicovanado tungstic acid, phosphovanado molybdo tungstic acid and silicovanadomolbydo tungstic acid.

The particular complex heteropoly acid precipitating agent most suitable will depend on the particular cationic or basic dyestuff to be precipitated and the end use to which it is to be applied. For instance while the silicon containing complex heteropoly acids generally display better brilliance silicon tends to adversely effect the shade of some pigments such as Rhodamine B (Color Index Basic Violet 10). Furthermore, tungsten based pigments tend to fade lighter while molybdenum pigments tend to fade darker so that an attempt to balance these effects may be made in situations where a resistance to fading is important. The most preferred complex heteropoly acid for preparing pigments suitable for printing inks, particularly for quick set off-set printing, is silico-molybdic acid.

The color enhancing agent may be any quaternary ammonium salt or the ammonium salt obtained from an amine derived from abietic acid or its natural or synthetic derivatives which do not also carry groups which would adversely effect the properties of the ultimate pigment. The substituents on nitrogen atom of the quaternary salt may be aliphatic or aromatic or the nitrogen atom may form part of an N-substituted heterocyclic ring system. The preferred substituents on the nitrogen are alkyl groups, especially long chain alkyl groups, and phenyl rings.

Preferred heterocyclic compounds are the aromatic N-substituted heterocycles, particularly the N-substituted pyridines and most especially the N-alkyl substituted pyridines. The most preferred of these are the normal long chain alkyl substituted pyridines such as cetyl pyridinium chloride. Other aromatic heterocyclics of interest include pyridazine, pyrimidine, and quinoline.

A number of suitable amines are known which can be obtained from rosin which is itself primarily abietic acid. These amines can be obtained by the conversion of the carboxyl group of resin or resinic acid to a cyano group by reaction with ammonia followed by hydrogenation to the amine. Amines of this type are described in United Kingdom Patent No. 1,156,836 as "resin amines". These amines may be derived from abietic acid itself or from its known derivatives such as the hydrogenated resin derivatives. Among these are dihydroabietic acid, tetrahydroabietic acid, and dimeric dihydroabietic acid. Suitable amines derivable from these starting materials include abietylamine, N-abietyl-trimethylenediamine and dehydroabietyl-amine. The most preferred of these amines are those obtained by the direct conversion of typical rosin to an amine by reaction with ammonia followed by hydrogenation, especially dehydroabietyl amine.

The pigment of increased brilliance is formed by precipitating the cationic dye from an aqueous solution with a complex heteropoly acid in the presence of the color enhancing agent. The color enhancing agent must be present in the aqueous bath at the time the precipitation is effected or the improvement in color value compared to that of a pigment prepared without the color enhancing agent will not be observed. No significant improvement in color value is observed upon combining the already precipitated pigment with the color enhancing agent. On the other hand, the color enhancing agent may be precipitated with the complex heteropoly acid and then suspended in the aqueous bath out of which the pigment is precipitated although this is a less preferred technique.

A pigment of increased color value may also be obtained by coprecipitating one of the primary cationic dyes listed hereinabove with a minor amount of another secondary cationic dye. Although the color value of the pigment obtained by precipitating this secondary dye alone in the presence of the color enhancing agent is not at all enhanced it does not significantly detract from the enhanced color value of the pigment obtained from the coprecipitation. Instead it merely effects the shade of the primary cationic dye. The same effect is not obtained if the primary and secondary cationic dyes are precipitated individually, each in the presence of the color enhancing agent, and then the two pigments are mixed. In order to minimize any loss of color value it is preferred to use about 10% or less of the secondary dye and it is particularly preferred to use 5% or less based on the weight of both dyes. Particularly advantageous results have been obtained with between about 2 and 5 wt. % based on the weight of both dyes.

The precipitation is generally effected by dissolving the primary cationic dye in an aqueous medium, adjusting the pH of this solution to the acidic side and combining this solution with the complex heteropoly acid. The color enhancing agent may be provided to the final bath at the same time as the dye solution and the precipitating acid or it may be premixed with either of the other two major components. It is preferred to premix it with the primary cationic dye solution. It is particularly convenient to adjust the temperature, pH and concentration of this solution so that the color enhancing agent is also in solution. It is also preferred to add the precipitating acid to the cationic dye solution.

The relative amount of cationic dye and complex heteropoly acid precipitating agent used are dictated by practical considerations as is the concentration of the reactants in the aqueous reaction medium. It is preferred to use sufficient acid to precipitate all of the cationic dye present because any dye not insolubilized may be lost upon recovery and washing of the pigment or may be trapped in the pigment to cause bleeding subsequently. This generally requires that sufficient complex heteropoly acid be provided not only to precipitate the primary cationic dye but also any secondary cationic dye present for shading purposes and the color enhancing agent. On the other hand, it is preferred to use only a slight excess of acid precipitating agent because any such excess is generally not recoverable for reuse. The concentration of these ingredients should be low enough that control of the temperature and the pH is fairly easy and low enough that the viscosity of the aqueous medium does not impair stirring or filtration. It is preferred to prepare a 2 wt. % or less solution of color enhancing agent and cationic dye and a 10 wt. % or less solution of complex heteropoly acid.

The color enhancing agent should be used in an amount sufficient to enhance the color value of the obtained pigment. It is preferred to use between about 2.5 and 15 parts and especially preferred to use between about 5 and 11 parts per ten parts of primary cationic dye. The use of more color enhancing agent than necessary to obtain the desired enhancement of color value results in an unnecessary consumption of complex heteropoly acid. In the aqueous acid bath in which the cationic dye is precipitated the color enhancing agent is a cationic ion which is about as susceptible to precipitation with this acid as the cationic dye.

The precipitation may be effected at any convenient temperature at which the cationic dye is in the aqueous solution. It is preferred to use a temperature at which the complex heteropoly acid is also almost completely in solution. Because of its complicated nature it may not be possible to entirely solubilize the precipitant acid. It is convenient to restrict the temperature to less than about 100° C. thus avoiding the need for pressurized equipment. Temperatures in excess of about 30° C. are preferred with temperatures in excess of about 40° C. being particularly preferred. It is also preferred to restrict the temperature to less than about 70° C., especially less than about 60° C. If a deeper masstone is desired temperatures of about 40° C. or less are advantageous.

The pH utilized in the various stages of the procedure will depend upon both the temperature utilized and the particular cationic dye, precipitant acid and color enhancing agent used. However, at least the precipitation step should be conducted in an acidic medium. In a preferred embodiment the cationic dye and color enhancing agent are dissolved in an acidic aqueous medium with a pH of no more than about 5 preferably less than about 4. The complex heteropoly acid is dissolved to form a fairly acidic aqueous medium with a pH of less than about 4.5 preferably less than about 2.5.

A particularly preferred technique is to prepare the complex heteropoly acid from an alkali metal salt of molybdenum or tungsten and an alkali metal silicate or phosphate in a strongly acidic aqueous medium and then add it to an aqueous solution of the color enhancing agent and cationic dye. It is especially desirable that this strongly acidic medium has a pH between about 2.4 and 2.7.

The primary utility for these pigments is in colored printing inks, including fluid inks. Among these inks those formulated for quick set off-set printing provide particularly interesting opportunities for the application of the present color enhanced pigments. These pigments may be utilized in formulating a process color for the four color printing process. The color enhanced pigments based on the Color Index Basic Red 12 for instance may be combined with the calcium salt of Lithol Rubine B (Color Index Pigment Red 57) to provide a process red printing ink for paper printing. They are thus effective replacements for Rhodamine 5G (Color Index Pigment Red 81) in shading the Lithol Rubine B pigment. In this regard they may have their own shades adjusted to suit particular shading applications by coprecipitation with secondary cationic dyes, particularly yellow dyes. Their natural shades tend to be a little too blue for an ideal shading component.

The invention is further illustrated but is not intended to be limited by the following examples in which all parts and percentages are by weight unless otherwise specified.

EXAMPLE 1

A primary cationic dye solution was prepared by stirring 17.0 g of a 45% solution of Color Index Basic Red 12 in acetic acid into 500 ml of water which was at 50° C. To this solution was added 10.0 g of a 50% solution of the acetate of dehydroabietyl amine in an isopropanol water mixture. The volume of this mixture was adjusted to 870 ml with water. The final pH was about 4.1.

A complex heteropoly acid solution was prepared by adding 27.5 g of sodium molybdate crystal (59.4 wt. % $MoO_3$) to 300 ml of 30° C. water. To this mixture was added 3.3 g of sodium silicate pentahydrate (28.3 wt. % $SiO_2$) and 0.3 g of $Na_2Cr_2O_7 \cdot H_2O$. The pH was adjusted to between 2.5 and 2.6 with 25.7 g of 20° Be HCl and the mixture was stirred for 15 minutes. The volume was adjusted to 525 ml with water and the mixture was heated to 50° C. The pH was rechecked and adjusted to the 2.5 to 2.6 range.

The complex heteropoly acid solution was added to the primary cationic dye solution over a period of about 10 minutes. This mixture was stirred until a spot test indicated that the dye was fully precipitated, i.e. there was no run out of color when a sample of this mixture was spotted on filter paper. The entire slurry was then filtered, washed with water and dried at 60° C. The yield of dry pigment was 28.9 g.

A masstone ink was prepared by combining 600 mg of this pigment with 1400 mg of an isophthalic alkyd varnish and mixing them in a muller using a 150 lb. weight. The muller was rotated 100 times, and then the contents were mixed with a spatula. This procedure was repeated two more times.

A bleach was prepared by combining 100 mg of this masstone ink with 5 g of a bleaching white and mixing them in a muller using a 50 lb. weight and 50 rotations followed by spatula mixing until uniformity was obtained. The bleaching white was a National Printing Ink Research Institute (NPIRI) standard white obtained by grinding 70 parts of zinc oxide with 30 parts of the methyl ester of abietic acid.

A small portion of the masstone ink was placed on a fairly smooth bond paper and pulled down with a drawdown knife in such a way that the top half was a fairly thick film and the bottom half was a tight thin film. A portion of the bottom half overlaid an inch wide black stripe previously printed on the bond paper. Immediately adjacent to this masstone ink on the same paper a masstone ink from a standard was pulled down in the same way. The standard was prepared in precisely the same manner as the pigment being evaluated except that the dehydroabietyl ammonium acetate was omitted and the amount of complex heteropoly acid was reduced by the amount necessary to precipitate the omitted ammonium compound. The pigment was much cleaner, brighter and more transparent.

The bleach of this pigment and the bleach of a standard prepared in the same manner but diluted to the same dye content as this pigment were drawn down side by side on a bond paper in the same way as the masstone ink. This pigment bleach was stronger, cleaner and bluer than the standard bleach by visual assessment. This assessment was confirmed by a computer assisted spectrographic analysis. At the reflectance minimum of this pigment bleach, 560 nanometers, it had a color strength more than 17% than that of the standard bleach according to the Kubelka-Munk coefficients for the bleaches at this wave length.

EXAMPLE 2

The procedure of Example 1 was repeated except that the dehydroabietyl ammonium acetate was replaced on a molar basis by cetyl pyridinium chloride. Once again the pigment displayed superior cleanliness, brightness and transparency in the masstone ink and a higher color strength in the bleach, as compared to the standard.

EXAMPLE 3

The procedure of Example 1 was repeated except that the dehydroabietyl ammonium acetate was replaced on a molar basis with mixed aliphatic/aromatic quaternary ammonium salts. These salts were comprised of equal amounts of n-alkyl dimethyl benzyl ammonium chloride and n-alkyl dimethyl (ethyl benzyl) ammonium chloride wherein the "alkyl" was a mixture of 12, 14, 16 and 18 carbon length normal alkyl chains. Once again the pigment displayed superior cleanliness, brightness and transparency in the masstone ink and a higher color strength in the bleach as compared to the standard.

COMPARISON EXAMPLE 1

The procedure of Example 1 was repeated except that the acetate of dehydroabietyl amine was not precipitated with the Color Index Basic Red 12. Instead the complex heteropoly acid solution was divided into two parts and used to precipitate individual solutions of the primary cationic dye and the brightening agent. The precipitated Color Index Basic Red 12 and dehydroabietyl amine were then mixed. Neither the masstone ink or the bleach showed any significant improvement compared to the masstone ink and bleach based on the standard.

COMPARISON EXAMPLE 2

The procedure of Example 1 was repeated except that the acetate of dehydroabietyl amine was replaced by a molar equivalent of ammonium acetate salt of each of the following amines:
  (1) aniline
  (2) cocoa amine
  (3) dicocoa amine
  (4) methyl dicocoa amine
  (5) the hydrogenated condensation product of tallow amine and acrylonitrile
  (6) the ethoxylation product of this tallow amine based diamine.

None of these experiments resulted in a pigment having any improvement in brightness, cleanliness or transparency compared to the standard. The color strength was in fact reduced somewhat due to the dilution of the precipitated dye by the amine.

COMPARISON EXAMPLE 3

The procedure of Example 1 was repeated except that the Color Index Basic Red 12 was replaced on a weight basis by each of the following cationic dyes:
Color Index Basic Yellow 21.
Color Index Basic Yellow 11.
Color Index Basic Yellow 29.
Color Index Basic Yellow 28.

None of these experiments resulted in a pigment having any improvement in brightness, cleanliness or transparency compared to the same primary cationic dye precipitated in the absence of the acetate of dehydroabietyl amine. In fact dilution of the precipitated dye by the precipitated amine reduced the color strength somewhat compared to the amine free version of the same precipitated dye.

COMPARISON EXAMPLE 4

The procedure of Example 1 was repeated except that the Color Index Basic Red 12 was replaced on a weight basis by Color Index Basic Red 1. There was only a slight improvement in the brightness and cleanliness of the resultant pigment compared to the same pigment prepared in the absence of the acetate of dehydroabietyl amine.

EXAMPLE 4

The procedure of Example 1 was repeated except that the Color Index Basic Red 12 was replaced on a weight basis with Color Index Basic Violet 10. There was a significant improvement in both the cleanliness and brightness of the resultant pigment compared to the same pigment prepared without the acetate of dehydroabietyl amine.

EXAMPLE 5

The procedure of Example 1 was repeated except that the Color Index Basic Red 12 was replaced on a weight basis with each of Color Index Basic Red 14 and Color Index Basic Red 28. The pigments obtained displayed a substantial improvement in cleanliness and brightness compared to the pigments prepared without the acetate of dehydroabietyl amine.

EXAMPLE 6

The procedure of Example 1 was repeated except that the 27.5 g of sodium molybdate crystal were replaced by 37.6 g Na tungstate crystals. The resultant pigment displayed a substantial improvement in both cleanliness and brightness compared to the same pigment prepared in the absence of the acetate of dehydroabietyl amine.

EXAMPLE 7

A shaded pigment was made by coprecipitating a Color Index Basic Red 12 with a Color Index Basic Yellow 29. 16.15 g of a 45 wt. % solution of the Basic Red 12, 0.38 g of the Color Index Basic Yellow 29 and 0.38 g of glacial acetic acid were added to 500 ml of 50° C. water. To this mixture were added 10.0 g of a 50 wt. % solution of the acetate of dehydroabietyl amine in isopropanol/water and 20 ml of water. The volume was adjusted to 870 ml with water and the pH was observed to be 4.1.

A complex heteropoly acid solution was prepared by adding 27.45 g of $Na_2MoO_4 \cdot 2H_2O$ and 3.23 g of sodium meta silicate to 300 ml of 30° C. water. The pH was adjusted to 2.5 with 20° Be HCl and the volume was adjusted to 525 ml with water. The solution was heated to 50° C.

The complex heteropoly acid solution was added to the dye solution over a period of ten minutes. The mixture was stirred until a spotting test of filtrate from this slurry showed no run out and the dye was fully precipitated. The slurry was then filtered, washed and dried at 60° C. 27.4 g of pigment was obtained.

This process was repeated except that the acetate of the dehydroabietyl amine was omitted. 17.2 g of a comparison pigment or standard was obtained.

The pigment was evaluated in the same manner as in Example 1 and found to be brighter, cleaner and more transparent than the same pigment prepared in the absence of the acetate of dehydroabietyl amine.

EXAMPLE 8

The procedure of Example 7 was repeated except that 15.3 g of the Color Index Basic Red 12 solution and 0.76 g of the Color Index Basic Yellow 29 were used. 510 ml of complex acid solution were consumed in producing 27.5 g of a pigment having superior cleanliness and brightness.

EXAMPLE 9

The procedure of Example 7 was repeated except that 13.6 g of the Color Index Basic Red 12 solution and 1.53 g of the Color Index Basic Yellow 29 were used. 500 ml of complex acid solution were consumed in producing 27.6 g of a pigment having superior cleanliness and brightness. A similar result was obtained using 16.75 g of the Red and 0.19 g of the Yellow.

EXAMPLE 10

The procedure of Example 7 was repeated four times to obtain pigments of superior cleanliness and brightness using different amounts of Color Index Basic Red 12 and Color Index Basic Yellow 28 as follows:

| Red | Yellow | Complex Acid Used | Pigment Yield |
| --- | --- | --- | --- |
| 16.75 g | 0.19 g | 500 ml | 27.4 g |
| 16.15 g | 0.38 g | 510 ml | 27.6 g |
| 15.30 g | 0.76 g | 510 ml | 27.6 g |
| 13.60 g | 1.53 g | 500 ml | 27.1 g |

EXAMPLE 11

A process red printing ink was prepared which included the pigment obtained by the procedure of Example 1. 24 parts of this pigment were combined with 36 parts of an alkyd isophthalate vehicle and ground on a three roll mill. 40 parts of a quick-set offset vehicle used in paper were added to this mixture.

A second ink was made up by wetting 19.67 parts of a Color Index Pigment Red 57 with 29.51 parts of an alkyd isophthalate vehicle and grinding on the same three roll mill. 50.82 parts of the same paper printing vehicle were added to this mixture.

The two inks were mixed in such a ratio that the final formulation contained 15 parts of the pigment of Example 1 to 85 parts of Pigment Red 57 in the final process red ink. This ink was utilized on a commercial lithographic printing line in a quick set off-set process.

The resultant lithograph was found to be equal in color to that obtained from an ink which contained Color Index Pigment Red 81 and Color Index Pigment Red 57 in a ratio of 30:70. Thus it was established that the pigment obtained by the procedure of Example 1 was more effective than Color Index Pigment Red 81 in enhancing the color value of Color Index Pigment Red 57 in a standard process red ink for the four color paper printing process. This was achieved at no compromise in working properties on the press or in bleed or light fastness properties of the finished printed matter.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A pigment composition comprising a cationic dye selected from the group consisting of
   Color Index Basic Red 12
   Color Index Basic Red 28
   Color Index Basic Red 14
   Color Index Basic Violet 10 which has been precipitated from aqueous solution by reaction with a complex heteropoly acid in the presence of a color enhancing agent selected from the group consisting of quaternary ammonium salts and ammonium salts of amines derived from abietic acid or natural or synthetic derivatives of abietic acid.

2. A process for the preparation of a pigment of increased brilliance and cleanliness from a primary cationic dye selected from the group consisting of Color Index Red 12, Color Index Basic Red 14, Color Index Basic Violet 10 and Color Index Basic Red 28 comprising precipitating the dye from aqueous solution by reaction with at least one complex heteropoly acid in the presence of a color enhancing agent selected from the group consisting of quaternary ammonium salts and ammonium salts of amines derived from abietic acid or its natural or synthetic derivatives.

3. A clean strong pigment suitable for shading Color Index Pigment Red 57 to produce a process red ink for high quality four color lithography equivalent to that obtainable by shading with Color Index Pigment Red 81 comprising the pigment obtained by precipitating Color Index Basic Red 12 from aqueous solution with a complex heteropoly acid in the presence of a color enhancing agent selected from the group consisting of quaternary ammonium salts and ammonium salts of amines derived from abietic acid or its natural or synthetic derivative.

4. The pigment of claim 3 wherein the complex heteropoly acid is selected from the group consisting of silicomolybdic acid, phosphomolybdic acid, phosphosilicomolybdic acid, silicotungstic acid, phosphotungstic acid, phosphosilicotungstic acid, silicomolybdic tungstic acid, phosphomolybdic tungstic acid, phosphosilicomolybdic tungstic acid, phosphovanado molybdic acid, phosphovanado tungstic acid, silicovanado molybdic acid, silicovanado tungstic acid, phosphovanado molybdic tungstic acid, and silicovanado molybdo tungstic acid.

5. The pigment of claim 4 wherein the complex heteropoly acid is selected from the group consisting of silicomolybdic acid, phosphomolybdic acid and phosphosilicomolybdic acid.

6. The pigment of claim 3 or 5 wherein the color enhancing agent is selected from the group consisting of pyridinium salts, alkyl aryl quaternary ammonium salts and the ammonium salts of dehydroabietyl amine.

7. The pigment of claim 6 wherein the color enhancing agent is selected from the group consisting of N-long alkyl chain substituted pyridinium salts, N-long alkyl chain substituted alkyl aryl quaternary ammonium salts and the ammonium salts of dehydroabietyl amine.

8. The pigment of claim 7 wherein the color enhancing agent is selected from the group consisting of cetyl pyridinium chloride, $C_{12}$ to $C_{18}$ alkyl dimethyl benzyl or ethyl benzyl ammonium chloride and the ammonium acetate of dehydroabietyl amine.

9. The pigment of claim 8 wherein the color enhancing agent is the ammonium acetate salt of dehydroabietyl amine.

10. The pigment of claim 9 wherein between 2.5 and 15 parts of the acetate salt is present per 10 parts of Color Index Basic Red 12 at the time it is precipitated and the precipitating agent is silicomolybdic acid.

11. A process red printing ink suitable for high quality four color lithography comprising
  (1) between about 5 and 25 wt. % of a pigment base comprising Color Index Pigment Red 57 and the pigment of Claim 10 in a weight ratio of between about 8.5:1.5 and 1:1, and
  (2) between about 95 and 75 wt. % of a printing ink vehicle.

12. A process for the preparation of a process red ink for high quality four color lithography comprising
  (A) the preparing of a replacement for Color Index Pigment Red 81 by
    (1) preparing an acidic aqueous solution of Color Index Basic Red 12 and a color enhancing agent selected from the group consisting of cetyl pyridinium chloride, $C_{12}$ to $C_{18}$ dimethyl benzyl or ethyl benzyl ammonium chloride and the ammonium acetate salt of dehydroabietyl amine,
    (2) preparing a complex heteropoly acid by dissolving an alkali metal molybdic salt and a silicate in a strongly acidic aqueous medium,
    (3) adding the complex heteropoly acid solution to the primary cationic dye solution, and
    (4) recovering the pigment by filtration, washing it, and drying it,
  (B) Preparing an ink from this pigment by
    (1) wetting the pigment with an ink vehicle,
    (2) grinding the wetted pigment to an appropriate particle size for an ink, and
    (3) diluting this pigment base to a concentration between about 5 and 25 pigment wt. % in an appropriate ink vehicle, and
  (C) preparing a press ready process red ink by combining this ink with an ink based on Color Index Pigment Red 57 in a weight ratio of pigments of between about 1.5:8.5 and 1:1.

13. A process for the preparation of a pigment of improved brightness and cleanliness from a primary cationic dye selected from the group consisting of Color Index Basic Red 12, Color Index Basic Red 14, Color Index Basic Red 28 and Color Index Basic Violet 10 comprising:
  (1) preparing an acidic aqueous solution of the primary cationic dye,
  (2) preparing a strongly acidic aqueous solution of at least one complex heteropoly acid selected from the group consisting of silicomolybdic acid, phosphomolybdic acid, phosphosilico molybdic acid, silicotungstic acid, phosphotungstic acid, phosphosilico-tungstic acid, silicomolybdic tungstic acid, phosphomolybdic tungstic acid, phosphosilico molybdic tungstic acid, phosphovanado molybdic acid, phosphovanado tungstic acid, silico vanado molybdic acid, silico vanado tungstic acid, phosphovanado molybdo tungstic acid, silico vanado molybdo tungstic acid and combinations thereof,
  (3) combining the cationic dye solution and the complex heteropoly acid solution in the presence of a color enhancing agent selected from the group consisting of quaternary ammonium salts and ammonium salts of amines derived from abietic acid, and
  (4) recovering the pigment by filtration and washing it.

14. The process of claim 13 wherein the complex heteropoly acid is added to the cationic dye solution.

15. The process of claim 13 or claim 14 wherein the color enhancing agent is added to the cationic dye solution before it is combined with the complex heteropoly acid solution.

16. The process of claim 13 or claim 14 wherein
  (1) the two solutions are combined at a temperature of about 40°0 C. or greater,
  (2) the pH of the complex heteropoly acid solution is between about 2 and 3, and
  (3) the color enhancing agent is added to the cationic dye solution before it is combined with the complex heteropoly acid solution.

17. The process of claim 16 wherein
  (1) the primary cationic dye is Color Index Basic Red 12, and
  (2) the color enhancing agent is selected from the group consisting of N-long alkyl chain substituted pyridinium salts, N-long alkyl chain substituted alkyl aryl quaternary ammonium salts and the ammonium salts of dehydroabietyl amine.

18. The process of claim 17 wherein the color enhancing agent is selected from the group consisting of cetyl pyridinium chloride, $C_{12}$ to $C_{18}$ alkyl dimethyl benzyl or ethyl benzyl ammonium chloride and the ammonium acetate of dehydroabietyl amine.

19. The process of claim 18 wherein the precipitating agent is silicomolybdic acid.

20. The process of claim 2 wherein a minor amount, based on the amount of primary cationic dye, of a secondary cationic dye which alone is not favorably effected by the presence of the color enhancing agent when precipitated by a complex heteropoly acid is dissolved in the aqueous dye solution.

21. A process for the preparation of a shaded pigment of increased brilliance and cleanliness from Color Index Basic Red 12 comprising precipitating this dye and a minor amount, based on this dye, of a dye selected from the group consisting of Color Index Basic Yellow 29 and Color Index Basic Yellow 28 from aqueous solution with at least one complex heteropoly acid in the presence of color enhancing agent selected from the group consisting of quaternary ammonium salts and ammonium salts of amines derived from abietic acid, or its natural or synthetic derivatives.

22. A pigment composition comprising a major amount of a precipitated primary cationic dye selected from the group consisting of Color Index Basic Red 12, Color Index Basic Red 28, Color Index Basic Red 14 and Color Index Basic Violet 10 and a minor amount of a precipitated secondary cationic dye which alone is not favorably effected by the presence of the color enhancing agent when precipitated by a complex heteropoly acid and which forms a laked pigment which can form a solid solution with the laked pigment of the primary cationic dye wherein the dyes are coprecipitated from aqueous solution by a complex heteropoly acid in the presence of a color enhancing agent selected from the group consisting of quaternary ammonium salts and ammonium salts of amines derived from abietic acid, or its natural or synthetic derivatives.

23. A pigment composition comprising a major amount of precipitated Color Index Basic Red 12 and a minor amount of precipitated secondary cationic dye selected from the group consisting of Color Index Basic Yellow 29 and Color Index Basic Yellow 28 wherein the dyes are coprecipitated from aqueous solution by a complex heteropoly acid in the presence of a color enhancing agent selected from the group consisting of quaternary ammonium salts and the ammonium salts of amines derived from abietic acid, or its natural or synthetic derivatives.

24. The composition of claim 23 wherein
(1) the complex heteropoly acid is silicomolybdic acid, and
(2) the color enhancing agent is an ammonium salt of dehydroabietyl amine.

* * * * *